Feb. 10, 1942.  H. HOOVER, JR  2,272,201

METHOD AND APPARATUS FOR SIGNALING

Filed July 28, 1939

INVENTOR.
HERBERT HOOVER JR.
BY
Lippincott & Metcalf
ATTORNEYS.

Patented Feb. 10, 1942

2,272,201

UNITED STATES PATENT OFFICE 2,272,201

METHOD AND APPARATUS FOR SIGNALING

Herbert Hoover, Jr., Sierra Madre, Calif., assignor to Consolidated Engineering Corporation, Pasadena, Calif., a corporation of California Application July 28, 1939, Serial No. 287,074

14 Claims. (Cl. 181—0.5)

My invention relates to methods and apparatus for producing either fixed or variable phase distortion during the reception of signals and has particular application to seismic prospecting.

For purposes of illustration I will show how my invention is applicable to the reception of seismic waves, and I shall indicate particularly how my invention applies to those cases in which variable phase distortion is useful.

As seismic prospecting is practiced, impulses are generated at or near the surface of the earth usually by the detonation of an explosive. Such impulses are made up of sinusoidal component waves of a wide range of frequencies. These impulses are propagated in all directions and are refracted, reflected, or diffracted at discontinuities in the subterranean media. Impulses returning to the surface of the earth reach receptors placed at one or more spaced points. These receptors convert the arriving impulses into corresponding electrical waves, which are then amplified, filtered, and recorded according to well-known methods.

It is generally assumed in seismic prospecting that all frequency components which are recorded simultaneously have travelled over the same path in the same time and represent a reflection from a single bed. From considerations to be given below it will become apparent that the various frequency components of a seismic wave travel with different effective phase velocities, and that the phase difference between two frequency components of any seismic wave accordingly increases with travel time or travel distance through the earth. For simplicity such phenomena may be regarded generically as either dispersion or variable phase distortion. Such dispersion may be acounted for in either of two ways. It may be due to transmission of the waves through layers which are not perfectly elastic or it may be due to an actual variation of phase velocity with frequency. The total apparent dispersion may be a combination of these two effects.

The dispersion effects arising from wave transmission through layers of imperfect elastic properties may be explained readily, at least in a qualitative manner, as follows.

Whenever reflection occurs at the boundary of two perfectly elastic media, the phase difference between the incident and reflected waves is 0 or $\pi$ radians, according to the relative values of the radiation resistances of the two media. If the phase change is 0 or $\pi$ the reflected wave has the same shape as the incident wave. But in imperfect reflection, such as reflection which occurs at the interface of media which are not perfectly elastic or at the interface of two absorbent media, the phase relation between the incident and reflected waves usually differs from 0 or $\pi$ radians, and the exact value of phase difference between the reflected and incident waves depends on the frequency. The phase difference between the transmitted and incident waves also varies with frequency.

Thus in both reflected and transmitted seismic waves the relative phase of the various frequency components may differ from the relative phase of the same components in the incident impulse.

Though the phase difference between the transmited and incident waves may be small for a single reflection, since seismic waves are subject to numerous such reflections in their propagation through the earth, the final phase difference existing between various frequency components in the received waves may be considerable.

If waves of all frequencies travel with the same velocity and if the relative phase change of the components of arriving waves is proportional to frequency, there is no phase distortion and the received wave is identical in shape with the wave sent out from the source. If, however, the relative phase change to which the arriving components are subjected in their travel is not proportional to frequency, there will be phase distortion. Generally speaking, the various components will arrive at different times corresponding to the envelope delays at the various frequencies. As a result, the received waves may bear no resemblance whatever to the waves sent out from the source. The character of a received seismic wave varies with the length of path over which the wave has been transmitted.

Differences in arrival time between the various components of an impulse may arise also by variation of velocity with frequency.

From measurements made at the surface, phase distortion arising from imperfect reflections or variation of velocity with frequency may be indistinguishable. For this and other reasons, I refer to use the term dispersion to include any phenomena in which the phase distortion of a received signal is a function of time. Phase distortion may also occur as a result of the properties of the earth at the source or at the receiving point or as a result of the interaction of the ground and the receptor. This type of phase distortion is fixed during any particular recording but may vary from point throughout an area under investigation.

Due to the fact that phase distortion increases with the travel time of the waves used in seismic prospecting, low frequency waves from one reflecting horizon may be recorded simultaneously with high frequency waves from another reflecting horizon separated from the first. It is clear therefore that where the properties or thickness of the subsurface strata are varying throughout an area, the character of the recorded waves will also vary from one setup to another. Dispersion therefore may account for a considerable loss of resolving power or definition in the exploration system.

By correcting for dispersion in the earth and fixed phase distortion arising at the source or the receptor according to my invention, component waves reflected from the same bed may be recorded with their original phase relationship. By under-correcting or over-correcting the natural phase distortion or dispersion in a controlled manner, the character of the waves may be distorted in any desired manner and sometimes made more easily correlatable.

The principal object of my invention is to modify the phase characteristics of received seismic waves in such a manner as to improve their correlatability from one receiving station to another. Another object of my invention is to make possible the correction for dispersion in any signaling system in which waves travel over paths of various lengths. Another object of my invention is to provide a system of phase distortion control for seismic prospecting which makes possible the substantially simultaneous recording of various frequency components originating simultaneously and returned to the receiver from the same discontinuity. Another object is to control the phase distortion in the wave translating system in compensating relation to the phase distortion which occurs in the medium through which the waves are transmitted. Another object of my invention is to provide for dispersion correction independently of the frequency response of the amplifying and filtering elements in the wave translating apparatus. Another object is to correct for phase distortion occurring as a result of the environment at either the sending or receiving points. It is also my object to utilize the phase changes which occur within filters used in wave translation to compensate for dispersion or fixed phase distortion either partially or entirely. These and other objects of my invention will be evident from the following disclosure and the appended claims.

Figure 1:
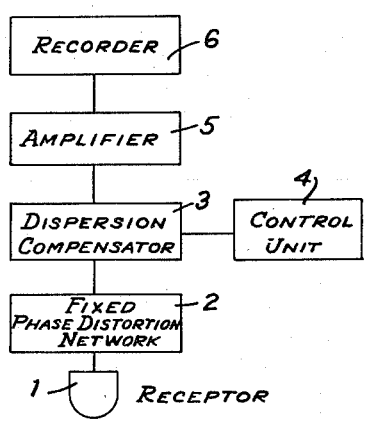
Fig. 1 is a block diagram of one form of my invention.

In Fig. 1 I have illustrated schematically one general type of receiving apparatus that may be operated in accordance with my invention. Electric waves produced at the receptor 1 in sympathy with arriving impulses pass through the fixed phase distortion network 2, the dispersion corrector, controller, or variable phase distortion network 3, amplifier 5, and are recorded by the recorder 6.

By means of the fixed phase distortion network 2 the overall phase distortion of the receiver, amplifier, and recorder may be varied or controlled in any desired manner. For instance the network 2 may compensate for the fixed phase distortion that occurs by virtue of the character of the wave source or, the environment of the receptor. Some sections of network 2 preferably possess uniform attenuation at all frequencies. Others may possess attenuation which depends on frequency.

The dispersion compensator or controller 3 is preferably of a type which attenuates or amplifies all frequencies equally. By means of the control unit 4 the characteristic of the dispersion control network 3 may be varied in any suitable manner, preferably as a predetermined function of time. It is to be understood, of course, that this control may be either manual or automatic, but preferably the latter. And if automatic it may be either mechanical or electrical.

Figure 2:
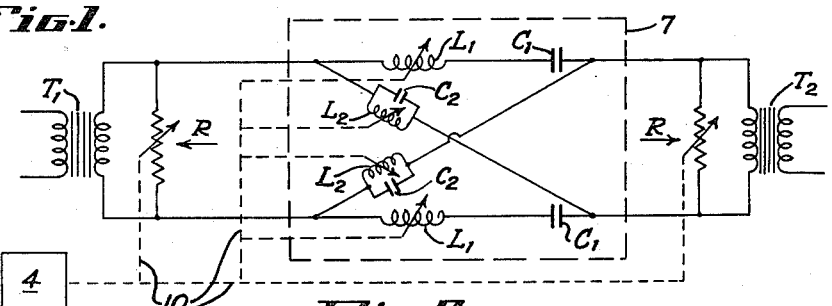
Fig. 2 shows a resonant lattice network which produces phase distortion without substantial attenuation of any waves passing therethrough.

The particular network of Fig. 2 is especially applicable to my invention because of the wide variations of frequency-phase characteristics that may be produced with it. A number of sections of this network may be used in conjunction with attenuation networks to obtain a wide variety of phase characteristics together with any type of attenuation characteristic desired. Such networks may be connected at any suitable point intermediate the receptor 1 and recorder 6. For best results the network should be terminated at each end by its characteristic resistance R.

If the inductances $L_1$ and $L_2$, and capacitances $C_1$ and $C_2$ connected as shown in Fig. 2 bear proportional relations and are such that $$\frac{b^2}{4} = \frac{L_1}{L_2} = \frac{C_2}{C_1} \qquad (1)$$

$$\omega^2_0 = \frac{1}{L_1 C_1} = \frac{1}{L_2 C_2} \qquad (2)$$

$$R^2 = \frac{L_2}{C_1} = \frac{L_1}{C_2} \qquad (3)$$

where R, the iterative impedance of this lattice network, is practically a pure resistance and $b$ and $\omega_0$ are constants; and $$f_0 = \frac{\omega_0}{2\pi}$$

is the characteristic frequency of the network; then the phase change to which a sinusoidal wave is subjected in its transmission through one such section is given by the equation $$\beta = 2 \tan \frac{b}{2}\left(\frac{\omega}{\omega_0} - \frac{\omega_0}{\omega}\right) \qquad (4)$$

where $\omega$ is $2\pi f$ and $f$ is the frequency of the sinusoidal wave. The envelope delay of this circuit is $$T = \frac{d\beta}{d\omega}$$

$$T = \frac{\frac{b}{\omega_0}\left(1 + \frac{\omega_0^2}{\omega}\right)2}{1 + \frac{b^2}{4}\left(\frac{\omega}{\omega_0} - \frac{\omega_0}{\omega}\right)2} \qquad (5)$$

Figure 3:
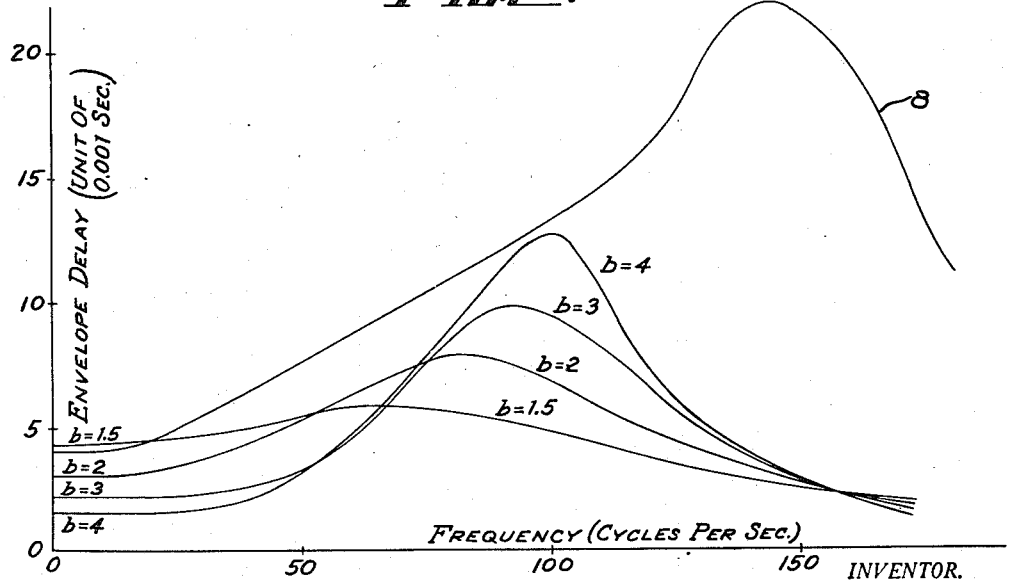
Fig. 3 illustrates a variety of envelope delay characteristics useful in connection with my invention.

In Fig. 3 I have plotted the envelope delay which may be produced by the resonant lattice network of Fig. 2 as ordinates against frequency as abscissae for cases in which $f_0=100$ cycles. The ordinates are expressed in units of 0.001 second. Curves are shown for parametric values of $b$ equal to 1.5, 2, 3, and 4. As an example of the magnitudes of circuit elements useful in adapting this circuit to my invention, it is readily seen that if $R=400{,}000$ ohms, the values of inductance and capacitance required to make $b=3$ and $f_0=100$ cycles per second are $L_1=966$ henries $C_1=0.00266$ mf.
$L_2=425$ henries $C_2=0.00596$ mf.

While inductances with as little resistance as possible should be used, it has been found that the ratio of the inductance to the resistance of a coil encountered in good choke coils does not seriously impair the effectiveness of the network.

Considering the curve for $b=3$ it is seen that the envelope delay for 0 and 100 cycles are 0.0020 second and 0.0097 second, respectively. In other words, for this case the 100 cycle component of a complex wave is delayed about eight thousandths of a second compared with components of extremely low frequency.

The shape of the envelope delay characteristic which can be provided in any given frequency range may be made of almost any desired shape. Usually it is desirable to have the envelope delay provided, approximately linear over the range of frequencies recorded. In the case of the networks whose envelope delay is given in Fig. 3 an approximately linear relation between delay and frequency exists from about 20 to 80 cycles ($f$ or) $b=2$, and from about 50 to 90 cycles for $b=3$ or 4. Several like units of this type are useful in producing wide differences in delay over a limited range of frequencies.

By cascading a number of resonant lattice networks having different circuit elements, many various shapes of the overall envelope delay may be provided. In curve 8 of Fig. 3, for example, is shown the combined envelope delay characteristic of a composite network using one section of resonant lattice network 7 for which $b_1=2$ and $f_{01}=100$ cycles per sec. and two sections with $f_{02}=150$ cycles and $b_2=4.5$. From an inspection of this curve it is readily seen that the envelope delay is practically linear from 20 to 110 cycles per second and that from about 15 to 120 cycles per second the delay varies not more than about 0.001 second from a straight line whose slope is $$m=\frac{dT}{df}=10^{-4}\frac{\text{sec.}^2}{\text{cycle}}$$

It can be shown that if the values of $b_1$ and $b_2$ for said sections of said composite network remain constant and the ratio of $$\frac{f_{01}}{f_{02}}$$

is kept at 1.5, then, if $f_{01}$ varies, the slope in the frequency range from about 0.20 $f_{01}$ to 1.30 $f_{01}$ will be $$m=\left(\frac{100}{f_{02}}\right)^2 10^{-4}\frac{\text{sec.}^2}{\text{cycle}}$$

The characteristic frequency $f_{02}$ of the composite network may be varied by using variable electrical elements of any known type. If the resistances terminating the networks be kept constant it is necessary to vary both the inductances and the capacitances. This can be done by ganging condensers and inductances according to principles well-known to those skilled in the art.

However, in many cases, it will be more convenient to keep the capacitances constant and to vary the inductances, always keeping the ratio of inductances constant according to Equation 1, and varying the terminating resistances approximately as the square root of the inductance in accordance with Equation 3. As illustrated schematically in Fig. 2 the control unit 4 may be an electric motor adapted to vary the inductances and terminal resistances in coordinated fashion as indicated by the dotted lines 10. In this case the slope of the phase distortion curve will be proportional to the inductance.

Figure 4:
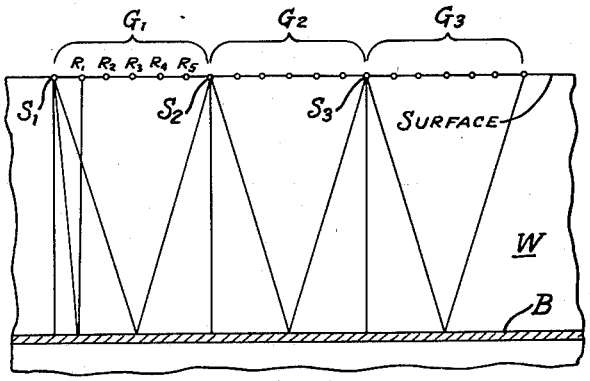
Fig. 4 is a schematic diagram of a sequence of setups used in one method of seismic surveying to which my invention is applicable.

In one well-known procedure of seismic surveying illustrated schematically in Fig. 4 explosives are detonated at shot points $S_1$, $S_2$, and $S_3$ successively and waves returning to the surface after reflection from a subsurface stratum, such as B, are recorded by receiving apparatus placed at suitable groups of stations $G_1$, $G_2$, and $G_3$.

In the procedure illustrated, seismic waves generated at a shot point at $S_1$ are received by the spread or group $G_1$ of receptors positioned at stations $S_1$, $R_1$ ... $R_5$, and $S_2$. Some of the paths followed by the waves received by each receptor are indicated by lines 1. The waves received by each receptor may pass through a reproducing channel such as that illustrated schematically in Fig. 1, and the waves from all channels may be recorded by a multiple string recording galvanometer. A record may also be made of waves generated at $S_2$ and received by group $G_1$. Another shot may be fired at $S_2$ and a record made of the waves received by group $G_2$. After continuing this process down the line any record obtained may be compared with any other record to aid in the study of the subsurface structure.

By introducing fixed distortion intentionally in the separate recording channels, I am able to compensate for irregular phase distortion arising because of the variation in the planting of receptors on or in the ground, or variation in the nature and thickness of material composing the weathered layer. Settings are preferably made empirically and are conveniently made to give a record which has an optimum appearance, preferably so that waves arriving early on the records have sharp beginnings and uniform character from one trace to another. The settings selected may be varied from one station or setup to another so that records of reflections at adjacent stations have a marked resemblance. By so adjusting the fixed phase distortion networks, compensation for differences in the character and thickness of the weathered layer, the plant of the receptors and other factors may be obtained.

Several records using different time functions for the dispersion compensator 3 and/or different settings of the fixed phase distortion network 2, may be made for each combination of shot point and receptor spread and the various records compared.

From the foregoing description there appear several reasons for using phase distortion networks in seismic prospecting. Some of these are:

1. To counteract undesirable phase distortion resulting from frequency response control in the amplifiers;

2. To correct for undesirable phase distortion occurring in any other element of the receiving apparatus such as the receptor or recording galvanometer;

3. To correct for undesirable phase distortion introduced by the earth, which correction may or may not vary with the path length or travel time of the waves; and 4. To simplify the correlation of records obtained in the same area by introducing phase distortion in the recording and thereby controlling the character of the recorded waves.

Within a given frequency range the dispersion is said to be normal or anomalous according to whether the low frequency or the high frequency waves travel the faster. It can be shown that whenever $b^2<4/3$ the resonant lattice network 7 of Fig. 2 can correct for normal dispersion only, and when $b^2>4/3$ correction for anomalous dispersion can be obtained in a portion of the spectrum below $f_0$. In other words, the highs or the lows are delayed the more according to whether $b^2$ is greater than or less than 4/3.

To illustrate the application of the composite network to seismic prospecting, suppose that the shot $S_1$ at which an impulse originates and the receptor station $R_1$ are established as usual near the surface at the top of a geologic column. If the dispersion is anomalous and is a linear function of frequency, the difference of arrival time of high and low frequency wave components returning to the surface after reflection from beds such as B will increase in proportion to the travel time, the high frequency components corresponding to a given reflection arriving at the receptor station $R_1$ earlier than the low frequency components.

Complete compensation for the dispersion occurring in the transmission of the impulse through the earth W may be readily obtained in this case and there will be no phase distortion in the recorded wave if there is no appreciable overall phase distortion in the receiver, amplifier, and recorder and if there is no phase distortion present due to conditions at the shot point or receptor. If the amount of dispersion be of the proper amount, this complete compensation may be obtained by keeping the capacitances of the aforesaid composite network constant, varying the inductances as an appropriate linear function of travel time, and coordinately varying the terminating resistances of the composite network as the square root of the inductance.

Now it is not practical to use values of inductance and resistance starting with the value zero in the composite network. The necessity for doing this may be avoided in a number of ways. One expedient is to establish initial values of inductance and resistance which are suitable to use, and, if the initial phase distortion corresponding thereto is not negligible, compensate for it by appropriate adjustment of sections of the fixed phase distortion unit. The inductances and resistances may then be varied in a suitable manner.

My invention may be applied to seismic prospecting in any one of various ways. For instance, a number of records may be obtained at the same setup, each corresponding to a different setting of an adjustable phase distortion network. From the records so obtained the waves that stand out best at various depths of said records may be selected and utilized in determining subsurface structure.

In another way of applying my invention, the phase distortion is varied as any function of time found suitable for emphasizing the character of waves received from various depths. A plurality of records may be made for each setup, each record corresponding to a different variation of phase distortion with time and the most comparable records used for determining subsurface structure.

In all cases to which my invention is applied it is to be understood the waves of undesired frequencies may be rejected or attenuated by appropriate filtering as in the amplifier 5. In some cases the frequency-amplitude response of the wave translating system is changed during the reception of the waves; this process may be adapted to cooperate with the phase shifting system to produce character on the record favorable to easy correlation of received waves.

I claim:

1. In seismic surveying apparatus the combination comprising means for generating seismic waves in the earth, a receptor for receiving the seismic waves after being subjected to dispersion by virtue of their travel within the earth, said receptor being adapted to convert said received seismic waves into corresponding electrical waves, means for recording said electrical waves, a variable phase distorting network including interconnecting impedances intermediate said receptor and said recording means, and means operatively associated with said impedances for varying the impedances and thus for varying the phase distortion produced by said network as a predetermined function of seismic waves travel time during the recording.

2. In seismic surveying, the steps which comprise generating seismic waves in the earth, which waves comprise sinusoidal components bearing a first frequency-phase relationship, receiving said waves after transmission through the earth, converting the received waves into corresponding electrical waves having a second and different frequency-phase relationship dependent upon the time of transmission of the waves through the earth, changing the frequency-phase relationship of the electrical waves as a predetermined function of said time of transmission, and thus modifying the form of the waves and reproducing the waves in the modified form.

3. In seismic prospecting the steps which comprise generating a seismic wave in the earth, receiving the wave after transmission through the earth, and varying the frequency-phase relationship of a received wave as a predetermined function of the travel time of the wave from a generating point in the earth to a reception point in the earth independently of any modification of the frequency-amplitude relationship of the received waves.

4. Method according to claim 3 in which a seismic wave is generated at a single point in the earth and received at a plurality of points in the earth spaced from each other, the frequency-phase relationship of each received wave being varied as a function of the travel time of the wave to the respective reception point.

5. Method according to claim 3 in which seismic waves are produced at different times at a series of generating points in the earth, the waves being received at a plurality of receiving points, the frequency-phase relationship of the waves received at the points at one time being varied in accordance with a different predetermined frequency-phase relationship than that prevailing when the waves generated at another point are received.

6. In seismic prospecting the steps which comprise generating a seismic wave in the earth, receiving the wave after reflection from a reflecting horizon in the earth, varying the frequency-phase relationship of the received wave as a predetermined function of the travel time of the wave from the point of generation in the earth to the reflecting horizon in the earth and thence to the point of reception in the earth independently of any modification of the frequency-amplitude relationship of the received wave.

7. In seismic prospecting the steps which comprise generating a seismic wave at one point in the earth, receiving the wave at another point in the earth, varying the frequency-phase relationship of the received wave as a predetermined function of the travel time of the wave from the generating point in the earth to the reception point in the earth without disturbing the frequency-amplitude relationship of the received waves.

8. Method according to claim 7, in which the frequency-phase relationship of the reproduced waves is substantially the same as the frequency-phase relationship of the original sinusoidal components.

9. In seismic prospecting apparatus, the combination which comprises a receptor for seismic waves, an electrical network having an input connected to the receptor and an output, said network including impedances so connected and arranged as to modify the time-phase relationship of different frequency components of waves passing through said network and adjustable control means associated with at least a portion of the impedances for varying the values thereof as a predetermined function of time elapsed from a predetermined prior instant and independently of the amplitude of the received waves.

10. In seismic prospecting apparatus, the combination which comprises a seismic wave receptor, an electrical wave transmission network having an input connected to the receptor and an output, impedance elements so connected and arranged in the network as to modify the relative phase of different frequency components of waves passing through the network without substantially modifying the relative amplitude of said components and adjustable control means associated with at least a portion of the impedances for varying the values thereof as a predetermined function of the time elapsed from a predetermined prior instant.

11. In seismic prospecting, the steps which comprise generating within the earth seismic waves having energy distributed among different frequency components which travel through the earth at different velocities, receiving said waves at a plurality of spaced points at the earth's surface after reflection from subsurface strata located at different depths beneath the surface of the earth and modifying the character of the received waves by changing the time-phase relationship of the frequency components of said waves in accordance with the length of path over which each of the reflected waves have traveled and independently of the frequency-amplitude relationship of the reflected waves.

12. In seismic prospecting, the improvement which comprises generating in the earth seismic waves containing energy distributed among different frequency components some of which travel more slowly than others through the earth, receiving said waves at a plurality of spaced points at the earth's surface after transmission over a path within the earth, recording the waves thus received at each point and modifying the character of the received waves by delaying the recording of the high speed components with respect to the recording of the low speed components.

13. In seismic prospecting, the improvement which comprises the steps of generating in the earth seismic waves containing energy distributed among different frequency components some of which travel more slowly than others through the earth, receiving said waves at a plurality of spaced points at the earth's surface after transmission over paths to and from a reflecting horizon within the earth, recording the waves thus received at each point, modifying the character of the received waves by delaying the recording of the high speed components with respect to the recording of low speed components, and controlling the relative delay between the recording of high and low speed components in accordance with the time elapsed between the generation and reception of said waves independently of the amplitude of the received waves.

14. In seismic prospecting, the improvement which comprises the steps of generating within the earth seismic waves containing energy distributed among different frequency components including relatively high frequency components which travel through the earth with higher speeds than relatively low frequency components, receiving said waves at a plurality of spaced points at the earth's surface after transmission through a portion of the earth and reflection from a reflecting horizon in the earth, recording the waves thus received at each point, and modifying the character of the received waves at each point by delaying the recording of the high frequency components of the waves with respect to the low frequency components of the waves.

HERBERT HOOVER, Jr.